United States Patent

[11] 3,628,611

| [72] | Inventor | Gaynor Carlson |
| | | R.F.D. No. 1, Herndon, Kans. 67739 |
| [21] | Appl. No. | 831,363 |
| [22] | Filed | June 9, 1969 |
| [45] | Patented | Dec. 21, 1971 |

[54] TRASH-CLEARING APPARATUS
9 Claims, 4 Drawing Figs.

[52] U.S. Cl. ................................................ 172/39, 172/66, 172/606
[51] Int. Cl. .................................................... A01b33/16, A01b 19/10
[50] Field of Search .......................................... 172/39, 54, 60, 63, 65, 66, 73, 118, 606, 183; 56/256

[56] References Cited
UNITED STATES PATENTS

| 29,741 | 8/1860 | Woodcock | 172/66 |
| 92,350 | 7/1869 | Paul | 172/66 |
| 310,283 | 1/1885 | Jean Jaquet | 172/66 |
| 375,741 | 1/1888 | Gilmore | 172/39 UX |
| 645,989 | 3/1900 | Wilson | 172/66 |
| 1,179,434 | 4/1916 | Hunt | 56/256 |
| 1,388,233 | 8/1921 | Larralde | 172/66 X |
| 2,572,298 | 10/1951 | Alvarez | 172/66 |
| 2,826,133 | 3/1958 | Moss | 172/65 |
| 2,886,113 | 5/1959 | Sorensen et al. | 172/39 |

FOREIGN PATENTS

| 1,043,030 | 6/1953 | France | 172/39 |

*Primary Examiner*—Robert E. Pulfrey
*Assistant Examiner*—Stephen C. Pellegrino
*Attorney*—Sheridan and Ross

ABSTRACT: When a grain drill moves across a field in a sowing operation the row of drill stems gathers stalks, stubble, and weeds which become aligned laterally and drag dirt along, either raising the drill stems from the ground or creating too much drag for the tractor. The invention comprises a series of shears, usually one for each drill stem, operating in a vertical fore and aft plane to chop the laterally extending trash elements into short pieces which then pass between the drill stems and do not pile up or drag dirt. The shears are operated by linkages actuated by rotation of the ground wheels. Linkages may be disconnected for travel over roads or clean fields to reduce wear.

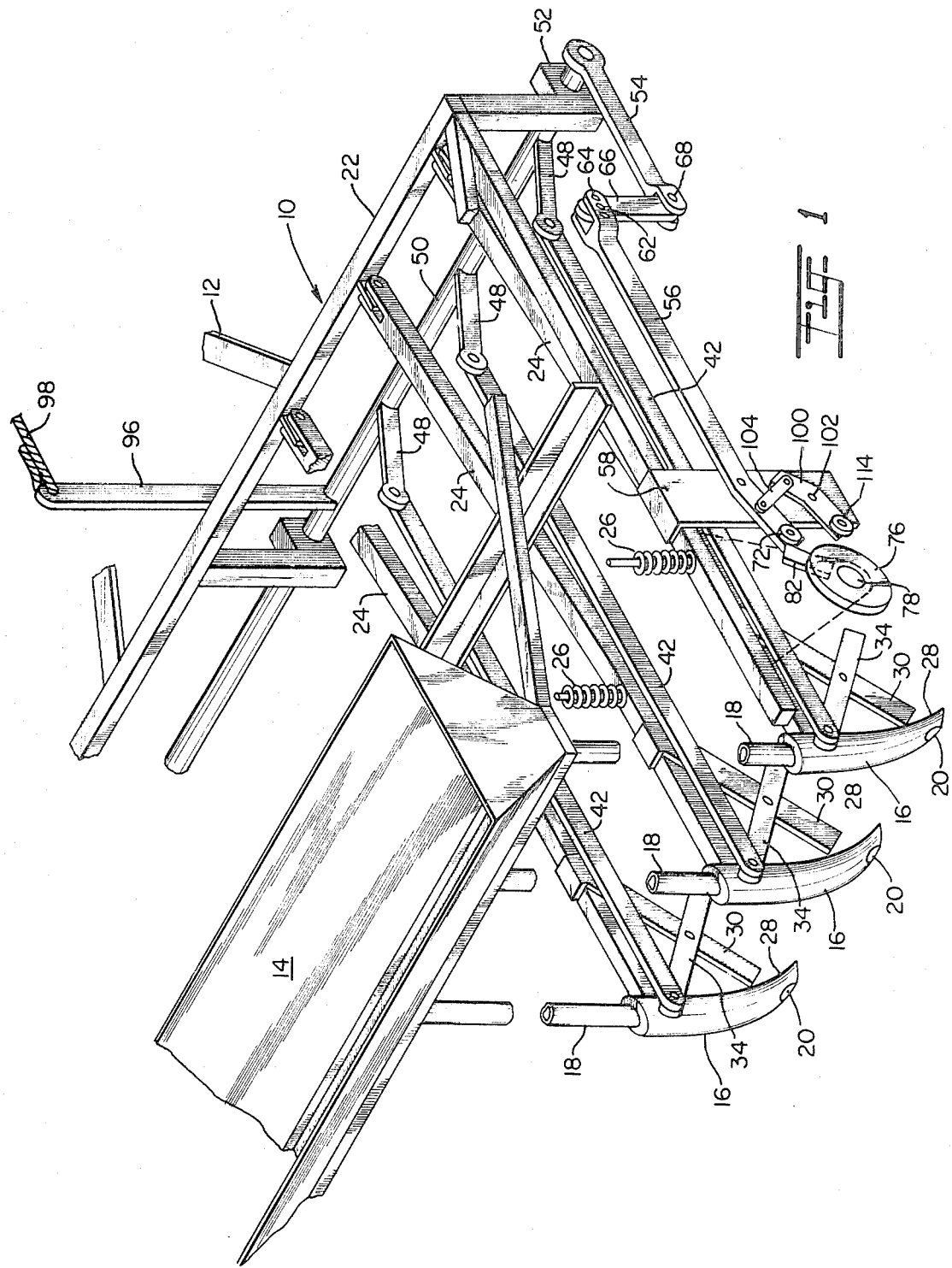

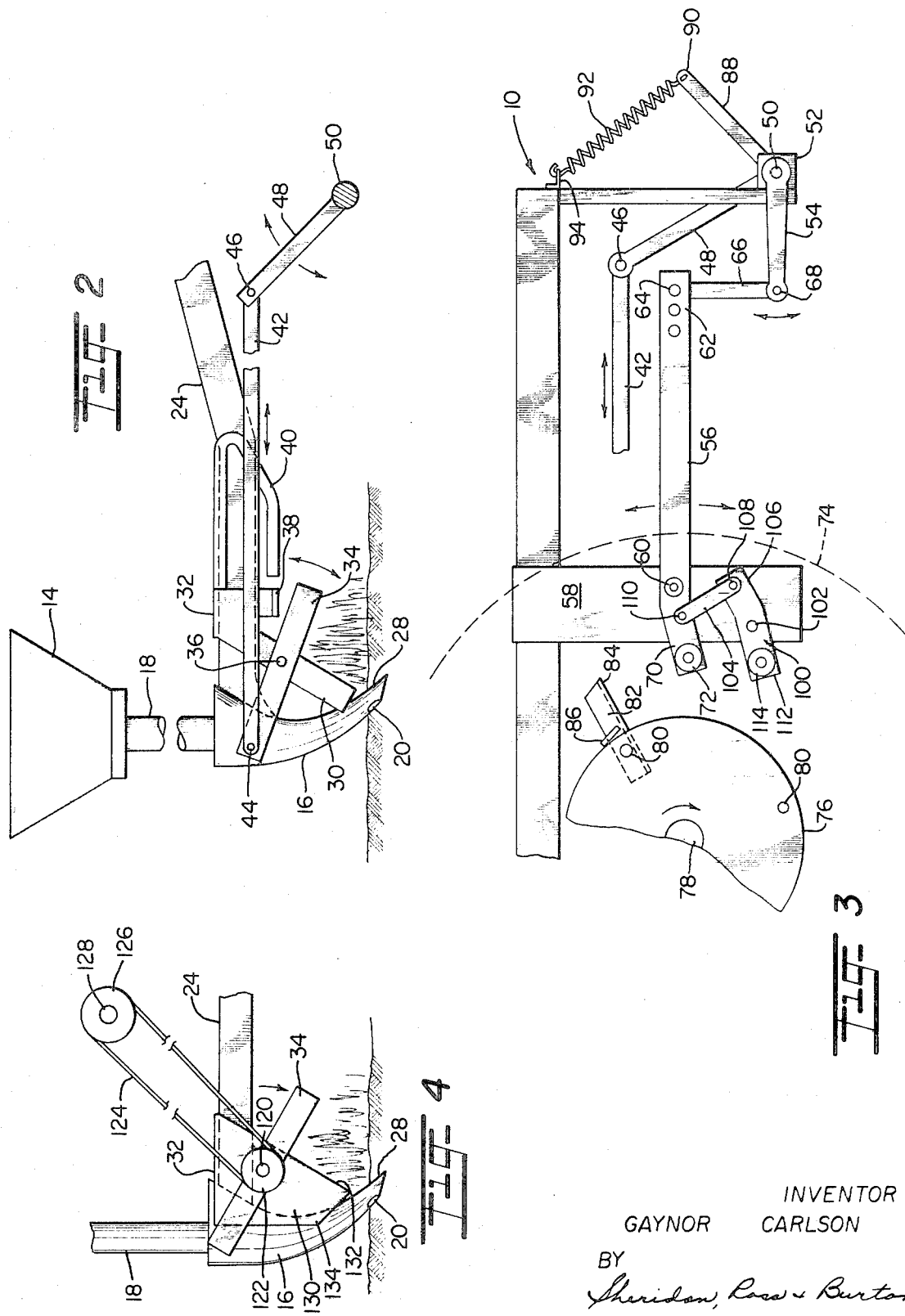

TRASH-CLEARING APPARATUS

BACKGROUND OF THE INVENTION

This invention lies in the field of farm machinery such as grain drills and has to do with the problem of clearing field trash which piles up ahead of the drill stems. It is directed more particularly to such machinery in which a laterally extensive frame supported by spaced ground wheels carries a plurality of drill stems arranged in laterally spaced relation either in a single line or in spaced dual lines.

Such machinery is in wide use and is plagued with the problem of field trash piling up ahead of the drill stems, particularly those of the type generally referred to as hoes. These hoes extend in a vertical direction and are in effect hollow columns which receive grain or seeds from an overhead hopper through depending tubes, distributing the grain through an opening in the rear wall of each column. The front wall of the hoe extends downwardly and forwardly in the form of a plow which cuts through the ground to form a furrow wide enough and deep enough to sow the grain.

Because of the shape of each hoe and the spacing between hoes of about six to ten inches in normal practice, the total assembly acts very much like a rake and gathers up all but the shortest stalks, weed stems, etc., gradually turning them to positions in which they extend laterally across the row of hoes. As the pile increases in size it begins to drag along considerable quantities of dirt so that in a short time the total resistance or drag is so great that the hoes rise out of the ground or the tractor is no longer able to pull the drill. The usual solution is to stop frequently and use a rake or other instrument to pull the trash pile out of the line of travel. This is inconvenient, time consuming, and very arduous work.

SUMMARY OF THE INVENTION

The present invention overcomes the difficulties mentioned above in a very simple manner and totally eliminates the need for frequent stops to clear away the trash, thus facilitating more efficient production. It is actuated by the movement of the drill, and may be readily disconnected to reduce wear when the drill is towed along a road or over a clean field where its action is not required.

Generally stated, the apparatus comprises a plurality of shearing devices associated with individual drill stems or hoes. There may be a shearing device for each hoe or one for every other hoe, depending on the spacing. The essential features are that the devices are located slightly ahead of their respective hoes and that they include a fixed shear member and a movable shear member, both located in a generally vertical longitudinally fore and aft extending plane. The shearing edge of the fixed or stationary member extends downwardly and rearwardly to confront the piled up trash elements, and the movable shear member swings downwardly and rearwardly to trap the trash elements between the two shear members and chop them into short pieces which can pass between the hoes. This is possible because the trash elements are all extending laterally while the cutting action is in a fore and aft direction. The motion of the movable shear member is quite rapid so that it additionally tends to toss the cut trash elements about, loosening the pile and breaking up the lateral pattern so that the trash elements pass between the hoes very easily.

In the presently preferred form of the invention, the stationary shear member is secured to its respective hoe and the movable shear member is pivotally mounted on the stationary shear member. The movable shear member is in the form of a blade pivotally mounted intermediate its ends, the cutting end extending downwardly and forwardly in open or retracted position. The upper end of the blade is connected by an actuating rod to a crank arm on a rockshaft which is rotated by the movement of a bellcrank. The latter is pivotally mounted on the drill frame so that an abutment at one end is engaged by a striker fastened to the ground wheel. Each turn of the ground wheel causes the striker to swing the bellcrank and move the associated linkage so that the blade will make one rapid cutting stroke. The linkage may be disconnected and the bellcrank swung out of the path of the striker whenever the cutting action is not needed.

BRIEF DESCRIPTION OF THE DRAWINGS

Various other advantages and features of novelty will become apparent as the description proceeds in conjunction with the accompanying drawings, in which:

FIG. 1 is a perspective view partially in schematic of a portion of a standard grain drill with the apparatus of the invention mounted in operative position;

FIG. 2 is a side elevational view of the shearing device in position and a part of the actuating mechanism;

FIG. 3 is a side elevational view of the remainder of the actuating mechanism; and FIG. 4 is a side elevational view of a modified shearing device.

DESCRIPTION OF THE PREFERRED EMBODIMENT

The total apparatus is generally illustrated in FIG. 1, where a portion of a standard grain drill is shown including a frame 10, towing connection 12, and a hopper 14 mounted on the upper rear portion of the frame. Each drill stem or hoe 16 is mounted directly beneath the hopper 14 and comprises an upright hollow column receiving seed or grain from the hopper through a tube 18 to drop into a furrow through exit hole 20. The frame includes a front crossmember 22 to which are pivotally connected a plurality of hoe support arms 24, each hoe being rigidly connected, by conventional connection means not shown, to the rear end of its support arm to rise and fall with it. A resilient force unit 26 is connected at its lower end to a support arm and at its upper end to the frame to resiliently urge each hoe into ground engagement.

It will be noted that the lower end 28 of each hoe is curved forwardly like a small plow so that as it is drawn along it will open a furrow large enough for deposit of the grain. Because of this construction and the relatively close spacing of the hoes, the assembly acts like a rake, gathering stalks, stubble, and weed stems before it as indicated in FIG. 2. The longer trash elements gradually become aligned crosswise or laterally of the direction of travel and gather dirt until the total pile forces the hoes out of the ground or produces too much drag for the tractor.

As best seen in FIG. 2, a shearing device is provided for each hoe or each alternate hoe in some cases. The shearing device is located ahead of the hoe and may be spaced between adjacent hoes but preferably is quite close to its adjacent hoe as shown. It includes a stationary shear member in the form of a blade 30 extending downwardly and rearwardly, secured at its upper end to a channel 32 welded or bolted to the support arm 24. Conventional alternative securing means may be used. The movable shear member is in the form of a blade 34 pivotally mounted intermediate its ends to blade 30 by means of a pivot pin 36. It is shown in its retracted or open position as extending downwardly and forwardly but with its lower end high enough to clear the trash. Its retracting movement is limited by engagement with the stop flange 38 which may be made integral with the blade 30. To insure that trash will not pile up above blade 34 a guard 40 may be secured to arm 24, the lower surface of the guard extending downwardly and rearwardly to depress the trash as it passes.

The shearing movement of blade 34 is produced by a linkage assembly actuated by movement of the ground wheel of the drill, each wheel actuating the devices on its half of the machine. The linkage includes an actuating rod 42 pivotally connected to blade 34 at 44 and pivotally connected at 46 to a first crank arm 48 which in turn is connected as by welding to an elongate rockshaft 50. The rockshaft is rotatably mounted in a series of bearings 52 carried by frame 10.

The mechanism for swinging rockshaft 50 is shown in FIG. 3. A second crank arm 54 is fixedly connected to rockshaft 50 by welding or pinning. A first bellcrank 56 is pivotally mounted intermediate its ends to a support bracket 58, depending from frame 10, by means of pivot pin 60 and extends in generally horizontal attitude. Its first end 62 is connected by pivot pin 64 to the upper end of link rod 66, the lower end of the rod being connected by a pivot pin 68 to crank arm 54. The second end 70 of the bellcrank is provided with an abutment preferably in the form of a roller 72.

The ground wheel 74, as diagrammatically illustrated in dotted lines, FIGS. 3, and its hub 76 are carried by shaft 78 which is journaled for rotation in appropriate bearings carried by frame 10. Lug bolts 80 serve to connect the wheel to the hub. A striker 82, which may be a piece of angle iron, is mounted on the hub as shown by passing one of the lug bolts through aligned holes in the striker, hub, and wheel. The end 84 of the striker extends out beyond the hub and the striker is prevented from rotating out of position by welding a stop 86 on the striker which lies in contact with the rim of the hub.

It will now be seen that as wheel 74 rotates the end 84 of the striker will contact abutment 72 on bellcrank 56 and force its second end 70 downward. This raises first end 62, link rod 66, and crank arm 54, causing clockwise rotation of rockshaft 50 and crank arm 48. Actuating rod 42 moves to the right as viewed in FIG. 2 and causes blade 34 to rotate clockwise through an arc of about 90°. The parts are so arranged and dimensioned that blade 34 closes on blade 30 just as abutment 72 has swung down far enough for end 84 of striker 82 to pass by.

One means for retracting blade 34 to its open position is provided in the form of a third crank arm 88 which is fixedly secured to rock shaft 50 as by welding and angles upwardly and forwardly. Its outer end 90 is connected by a tension spring 92 to a bracket 94 fixed on frame 10 and the spring is stretched by the shearing movement of the linkage. When abutment 72 is released by striker 82 the spring contracts and pulls the parts back to their initial position.

In some cases it is desirable to render the wheel actuator mechanism temporarily inoperative, as when towing the drill on a road or over a relatively clean field. This is accomplished by removing pin 64 and allowing end 62 of bellcrank 56 to drop down so that abutment 72 is swung out of the path of striker 82. In the event that some trash does pile up on the relatively clean field, means are provided for occasional manual operation of the shearing devices. For this purpose a generally vertical fourth crank arm 96 is fixedly secured to rockshaft 50 as seen in FIG. 1, and a rope 98 extends from the upper end of arm 96 to theoperator's position. When he sees that a pile is accumulating he pulls the rope and operates blade 34. When he releases the rope, spring 92 will cause blade 34 to retract to open position.

While the spring retraction system is generally satisfactory for light work the heavier trash sometimes causes the blades to bind in shearing position and the spring is unable to release them. To overcome this difficulty, a positive retraction system may be provided. This system is shown in FIG. 3 where a second relatively short bellcrank 100 is rotatably mounted on bracket 58 by pivot pin 102. A force link 104 is pivotally connected to the first end 106 of the bellcrank by pivot pin 108 and to bellcrank 56 at a point between pivot 60 and end 70 by a pivot pin 110.

It will seen that with this arrangement the two bellcranks are constrained to move in opposite angular directions. When end 70 moves downward, the second end 112 of bellcrank 100 will move upward. End 112 is also provided with an abutment in the form of roller 114. The parts are arranged and dimensioned so that as abutment 72 is forced downward abutment 114 rises into a position in the path of the striker. As the striker leaves abutment 72 it engages abutment 114 and pushes it downward until the abutment clears the path of the striker. This movement, acting through force link 104, moves bellcrank 56 back to the position of FIG. 3 and blade 34 is positively retracted to its open position.

While the spring 92 is not essential when the positive retraction system is used, it will be noted that when pin 64 is removed the positive retraction becomes ineffective and spring 92 is required to produce retraction after manual operation. Therefore both retraction systems should be provided if manual operation at any time is contemplated.

Referring to FIG. 4, a modified power-driven shearing mechanism is shown in which a shaft 120 is rotatably mounted to support arm 24 by conventional mounting means not shown. A rotary cutting blade 34 is fixedly mounted to shaft 120 and is rotated through 360° by means of pulley 122 fixedly attached to shaft 120. The pulley 122 is driven through belt 124 by drive pulley 126 fixedly attached to drive shaft 128 driven by a conventional power source not shown. The power source may be a separate motor, or a power takeoff device, or a gear reduction or multiplying mechanism, or a wheel, or other conventional arrangement for driving auxiliary equipment. In this modification the fixed blade 30 is replaced by the flat surface 130 and edge 132 of brace 134 attached to support arm 24 by channel 32 or other conventional means.

While this invention has been illustrated by its application to grain drills, the shearing assembly can obviously be used on other farm equipment where trash clogging is a problem. It is an advantage of the invention that the shearing assembly can be readily incorporated in standard drills and other farm equipment on the market with only minor modification.

I claim:

1. Trash-clearing apparatus for a grain drill having a laterally extensive frame, ground wheels at opposite sides of said frame, and a plurality of generally vertically depending drill stems carried by said frame in laterally spaced relation with their lower, grain-feeding ends substantially at ground level, comprising shearing devices associated with at least some of said drill stems each shearing device including a stationary, bladelike shear member mounted adjacent to its respective drill stem in a substantially vertical plane extending for and aft of the grain drill and having a forward shearing edge extending angularly upwardly and forwardly from adjacent the lower end of its respective drill stem; a movable shear member for each stationary shear member mounted on a laterally extending pivotal support for movement in a substantially vertical plane and provided with a shearing edge cooperating with the shearing edge of the stationary shear member to cut elongate laterally extending trash elements into short lengths to cause them to clear the drill stems; and means carried by said frame to produce movement of said movable shear member about said pivotal support.

2. Apparatus as claimed in claim 1; and stop means fixedly located with respect to said stationary shear member and adapted to engage a portion of said movable shear member to limit the extent of its opening movement to a predetermined position.

3. Apparatus as claimed in claim 1; and a trash guard mounted forward of each shearing device having a surface extending downwardly and rearwardly to depress the trash elements into a suitable location for cutting by the shearing device.

4. Apparatus as claimed in claim 1; said movable shear member being in the form of an elongate blade mounted intermediate its ends on said pivotal support; the means to produce movement of said blade about the pivotal support including a horizontally laterally extending rockshaft rotatably mounted on said frame; a crank arm on said rockshaft; an actuating rod extending between an end of said blade and the end of said crank arm; means to rotate said rockshaft and swing said blade to shearing position; and resilient means connected to said frame and said rockshaft to cause said blade to return to open position.

5. Apparatus as claimed in claim 4; said means to rotate said rockshaft comprising an elongate crank arm secured to and extending upwardly from said rockshaft; and manually operable tension means to swing said elongate crank arm through a suitable arc of movement.

6. Apparatus as claimed in claim 1; said movable shear member being in the form of an elongate blade mounted intermediate its ends on said pivotal support; the means to produce movement of said blade about the pivotal support including a horizontally laterally extending rockshaft rotatably mounted on said frame; a first crank arm on said rockshaft; an actuating rod extending between an end of said blade and the end of said crank arm; a second crank arm on said rockshaft; a first bellcrank having first and second ends and pivotally mounted intermediate its ends on said frame for swinging in a vertical fore and aft plane; a link rod connected to the first end of said bellcrank and the end of said second crank arm; a first abutment on the second end of said bellcrank; and a striker mounted on said wheel and successively engageable with said abutment upon repeated rotation of the wheel; each engagement causing arcuate movement of the bellcrank and resultant movement of the linkages to swing the blade to shearing position.

7. Apparatus as claimed in claim 6; and a second bellcrank having first and second ends and pivotally mounted intermediate its ends on said frame for swinging in the same vertical fore and aft plane as said first bellcrank; a force link connected at one end to the first end of said second bellcrank and at the other end to said first bellcrank at a point intermediate its second end and its pivotal mounting; and a second abutment on the second end of said second bellcrank; said abutments being spaced slightly from each other along the path of movement of said striker to be engaged sequentially thereby; the engagement of the striker with said second abutment causing said second crank arm to rotate in a direction to act through said force link on said first arm and return it to its original position and cause said blade to swing to its open position.

8. Apparatus as claimed in claim 6; the connection between said first bellcrank and said second crank arm being releasable to allow said first bellcrank to swing to a position in which both abutments are retracted from the path of movement of said striker to render the shearing device temporarily inoperative.

9. Apparatus as claimed in claim 1 in which said movable shear member is rotatable through 360°.

* * * * *